July 15, 1958 — A. G. GETZ — 2,843,365
HEAT EXCHANGE UNIT CELLULAR CORE
Filed Feb. 5, 1954 — 2 Sheets-Sheet 1
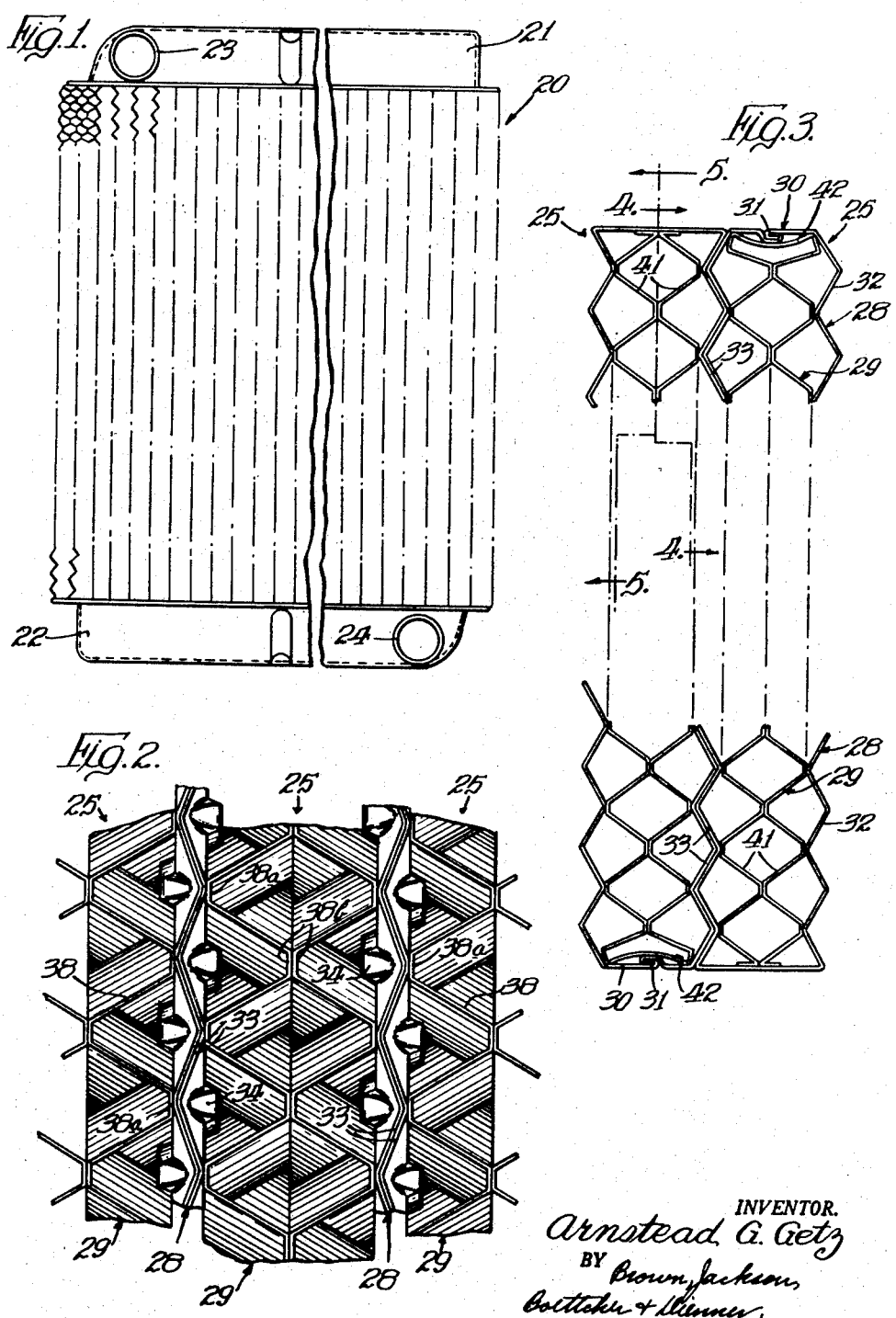
INVENTOR.
Armstead G. Getz July 15, 1958 A. G. GETZ 2,843,365
HEAT EXCHANGE UNIT CELLULAR CORE
Filed Feb. 5, 1954 2 Sheets-Sheet 2
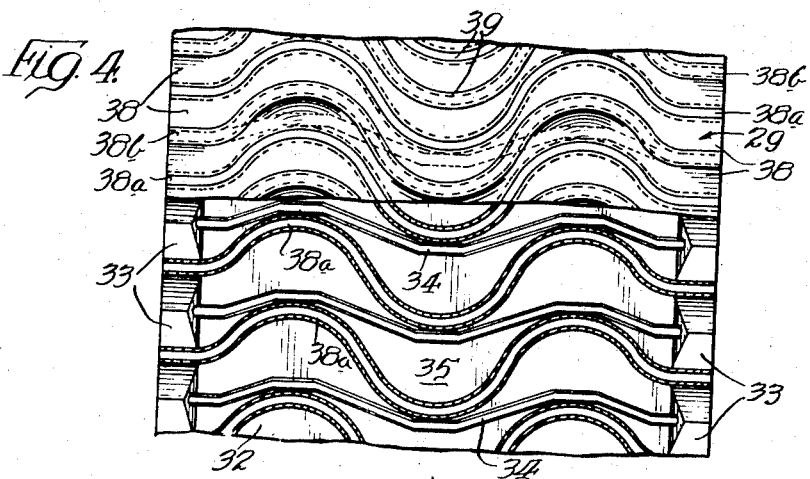
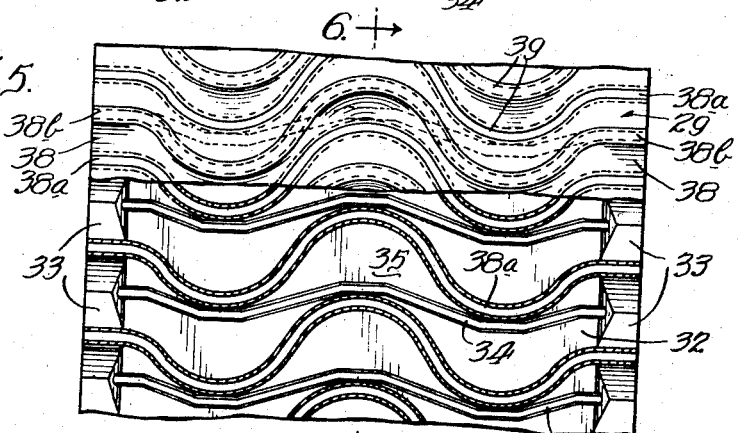
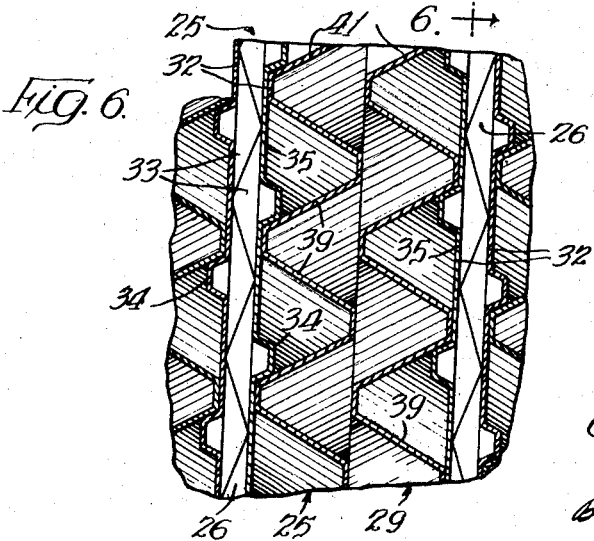
INVENTOR.
Arnstead G. Getz
BY Brown, Jackson,
Boettcher & Dienner.
Attys.

United States Patent Office 2,843,365
Patented July 15, 1958

2,843,365

HEAT EXCHANGE UNIT CELLULAR CORE

Arnstead G. Getz, Lakewood, Ohio, assignor to The Bishop and Babcock Manufacturing Company, Cleveland, Ohio, a corporation of Ohio Application February 5, 1954, Serial No. 408,330

5 Claims. (Cl. 257—130)

This invention relates to cores for heat exchange units such as automobile radiators and heaters, and has to do with cellular cores fabricated from sheet metal strips secured together at their front and back margins and defining water passages and air passages between the water passages.

Cores of the character stated are known and extensively used. In all of such cores with which I am familiar, the air passages are so constructed that the air passing therethrough has, in considerable portion, free flow from front to back of the core. That results in columns of air flowing through the respective air passages without contacting the walls thereof and of the water passages for abstracting heat therefrom, so that the heat exchange capacity of the known cellular cores above referred to is rather low. Accordingly, the total amount of metal in such a heat exchange core, in order to attain a given total heat exchange capacity, is rather large, which is reflected in the cost of production.

My invention is directed to a heat exchange core of cellular construction which avoids the above noted objections to the known cores. I have discovered that by constructing the air passages so as to have intimate metal to metal contact of the separators with the walls of the water passages for substantially their full extent from front to back and produce high turbulence of the air passing therethrough, effective to assure heat exchange contact of all of such air, or substantially so, with the walls of the air passages and the walls of the water passages, the heat exchange efficiency of the core can be materially increased. That renders possible a substantial saving in metal in a core of a given heat exchange capacity with a corresponding saving in cost of production. The core of my invention comprises a plurality of units or sections assembled to provide water passages between them, each section having two water walls and a separator therebetween provided with transverse undulatory ribs seating on the water walls in metal to metal contact and defining therewith undulatory air passages extending from front to back of the core. The separators preferably are formed of two opposed sheet metal strips corrugated transversely to provide undulatory ribs, and disposed with the ribs at the opposed inner faces of the strips in seating contact and defining therebetween undulatory air passages extending from front to back of the core, additional to the air passages between the separator and the water walls. The separator is preferably formed from a single length of sheet metal folded transversely to provide two parallel strips or arms, the ribs of one being reversed relative to the ribs of the other. That provides undulatory air passages extending from front to back of the core, between the arms of the separator, which is conducive to high turbulence of the air and intimate heat exchange contact thereof with the arms of the separator. The water walls of each section are provided with transverse ribs and flat surfaces therebetween, the separator ribs seating on such flat surfaces and fitting between the water wall ribs so as to be restrained thereby against relative transverse movement. The ribs of the water walls and the separators of the respective sections provide cooperating elements for accurately positioning the elements thereof in proper assembled relation, which is conducive to expedition and facility in assembling and securing together the units of the core. Further objects and advantages of my invention will appear from the detail description.

In the drawings:

Figure 1 is a front view of a heat exchange unit core embodying my invention;

Figure 2 is a fragmentary front view, on an enlarged scale, of the core of Figure 1;

Figure 3 is a front view of two of the core sections in assembled relation and partly broken away, on an enlarged scale relative to Figure 1;

Figure 4 is a fragmentary sectional view taken substantially on line 4—4 of Figure 3;

Figure 5 is a fragmentary sectional view, taken substantially on line 5—5 of Figure 3; and Figure 6 is a fragmentary sectional view taken substantially on line 6—6 of Figure 5, on an enlarged scale.

The core of the instant application is in the nature of an improvement over the core of my patent for Cellular Core for Heat Exchange Units, No. 2,594,008, issued April 22, 1952.

In Figure 1 I have shown a cellular core 20 embodying my invention, which may be used in an automobile heater or radiator, or for any other suitable purpose. The core 20 is provided with flanged top and bottom tanks 21 and 22, respectively, suitably secured thereto, conveniently by soldering, these tanks opening into the vertical water passages of the core and being respectively provided with inlet and outlet nipples 23 and 24. The core 20 is formed of a suitable number of units or sections 25 suitably assembled and secured together defining between them vertical water passages 26 extending from the top to the bottom of the core, as shown in Figures 2 and 6.

Each of the units 25 comprises a water wall member 28 and a separator 29 therein. The water wall member 28 is formed from a strip of brass of thin gauge which is flattened transversely at its midlength, at 30, and folded over on itself, the two ends of the strip being secured together by a lock seam 31. The member 28 thus produced is of elongated rectangular or oblong shape as viewed from in front, as in Figure 3. The front and rear portions of the arms or water walls 32 are corrugated at 33 and are slightly off-set inwardly relative to the water passages 26, as will appear more fully later. Each of the water walls 32 is provided with narrow transverse ribs 34 of zig-zag formation lengthwise projecting a slight distance outward therefrom relative to the water passage 26 and spaced apart to provide relatively wide flat seating surfaces 35 therebetween, as shown more clearly in Figures 4, 5 and 6, disposed in the plane of wall 32. The ribs 34 project outward relative to the water passage, as above stated, and inward of the respective sections of the core, are centered relative to the corrugations 33 and preferably, though not necessarily, are continuous between the corrugated margins 33 of the water wall. The water wall ribs 34 of zig-zag formation projecting inwardly of the respective core sections respectively provide a plurality of pockets or bays opening in alternately opposite directions lengthwise of the water wall, as clearly shown in Figure 4.

The separator 29 is formed from a strip of copper of light gauge of the same width as the brass strip from which the water wall member 28 is formed, the copper separating strip having its front and back edge portions provided with narrow corrugations 38 straight transversely of the strip and having flattened apices. The separator strip is further corrugated to provide, at each face of each arm thereof, transversely extending undulatory ribs 39 of substantially V-shape in cross section, the apices of which are flattened and extend between and connect the apices of aligned corrugations 38 at the edges of the strip. The crests of the undulations of the separator ribs 39 are spaced lengthwise thereof the same as the crests of the bays of the water wall ribs 34. The vertical distance between the crests of any two successive undulations of the respective separator ribs 39, at the outer faces thereof, is the same as the vertical distance between the crests of any two successive bays of the respective ribs 34 of the water walls 32, at the inner faces thereof. The corrugated copper separator strip is flattened at its midlength and is folded over on itself to provide the separator 29, comprising the two parallel strips or arms 41 connected at one end by the flat element 42 and free from each other at their other ends.

The separator 29 is of elongated rectangular or oblong shape in front view and is of proper width to fit snugly within the water wall member 28, with the ribs 39 at the inner faces of arms 41 seating on each other, the flat apices of ribs 39 at the outer faces of arms 41 seating upon the flat seating surfaces 35 of the water walls 32, with the undulations of the separator ribs 39 seating in the bays of the water wall ribs 34, as shown in Figures 4, 5 and 6. The separator ribs 39 thus cooperate with ribs 34 of the water walls 32 for accurately positioning the arms 41 of the separator 29 relative to each other and to the water walls 32, with the flat apices of the undulatory ribs 39 seating, for substantially their full length, upon the flat seating surfaces or areas 35 of water walls 32 in metal to metal contact therewith. As will be understood from what has been said, and as is shown more clearly in Figures 2 and 6, the ribs 39 at the inner faces of arms 41 of the separator 29 are reversed, that is, the ribs 39 of one arm 41 are reversed relative to the ribs 39 of the other arm 41, the ribs of one arm seating on the ribs of the opposed arm. That is conducive to high turbulence of air flowing between the arms 41 of the separator 29, which is desirable. Further, the undulations of adjacent separator ribs 39 overlap, so that the crests of the undulations of each rib 39 extend at least to, preferably beyond, the planes of the crests of the undulations of the two next adjacent ribs 39 as shown in Figures 4 and 5. That assures that air flowing between the water walls 32 is forced to follow a circuitous or undulatory path assuring that it is brought into intimate contact with the metal of the separator, with resultant increased efficiency in heat transfer.

The separator 29, formed in the manner stated, is inserted into the water wall member 28 from front to back thereof, with the apices of the undulator ribs 39 at the outer faces of arms 41 seating flatwise upon areas 35 of water walls 32, ribs 39 cooperating with ribs 34 for positioning the arms 41 of separator 29 relative to each other and to the water walls 32. In the fully inserted position of separator 29 the front and back edges thereof are flush with the front and back edges of the water wall member 28, the flat apices 38a of the corrugations 38 extending outwardly of arms 41 of separator 29 seat upon the apices of the opposed corrugations 33 of the water walls 32, and the flat apices 38b of the opposed inwardly extending corrugations 38 of arms 41 of the separator 29 seat upon each other; as shown in Figure 2. Since the undulatory ribs 39 at the inner faces of arms 41 of separator 29 are reversed, the undulations of the opposed ribs cross each other, as will be understood from what has been said and from Figures 2 and 6, providing between them openings establishing communication between the undulatory channels at opposite sides of each of the ribs, provided by the ribs at the inner faces of arms 41 of separator 29. The undulations of the ribs 39 overlap, as above stated and as is shown more clearly in Figures 4 and 5, providing between the ribs 39 undulatory air passages each of curvilinear formation throughout and having a plurality of alternately oppositely directed bends merging smoothly into each other.

The corrugations at the front and back edge margins of arms 41 of separator 29 define a vertical series of diamond shaped openings for inlet and exit of cooling air to and from the tortuous or undulatory passages between the ribs 39, and the corrugations 33 of the water walls 32 define, with the corrugations 38 of arms 41 of separator 29, two vertical series of air inlet openings, at the front of the unit, and two vertical series of openings of approximately diamond shape at the back of the unit, between arms 41 of separator 29 and water walls 32, these openings communicating with the undulatory passages between the ribs 39 at the outer faces of arms 41 of separator 29.

Cooling air flowing through the passages between the arms 41 of separator 29 and the water walls 32 is forced to flow through undulatory paths and is thereby subjected to high turbulence so as to bring it into intimate heat exchange contact with the water walls and with ribs 39 of arms 41 of separator 29. Likewise, air flowing between arms 41 of separator 29 flows through undulatory passages and is subject to high turbulence. In that manner, air flowing through the unit is brought into intimate heat exchange contact with the metal walls thereof, thereby assuring high heat exchange efficiency of the unit. Additionally, the ribs 39 at the outer faces of arms 41 of the separator 29 have a large area of metal to metal contact with the water walls 32, and the ribs 39 and the corrugations 38 also have a large area of contact at the inner faces of arms 41; assuring a high rate of heat transfer from the water flowing through the water passages, to be explained more fully presently, to the air cooled parts of the structure.

In constructing the core of Figure 1, a suitable number of units or sections, each comprising a water wall member and a separator therein, are assembled in side to side relation, with the marginal corrugations 33 of each water wall 32 meshing in the marginal corrugations of the next adjacent water wall and, in cooperation therewith, positioning the units accurately in proper relation while spacing the adjacent water walls 32 apart providing therebetween the water passages 26; as in Figures 2 and 6. The block of assembled units is then clamped together in a suitable frame, with the tanks 21 and 22 clamped on the top and the bottom of the block and opening into the water passages 26. The entire assembly is then dipped, first the front and then the back, in a suitable flux or acid solution, after which the assembly is dipped, first the front and then the back, in molten solder, thus soldering together the water walls and the separators so as to produce, as a unitary structure, the core 20. In this dip soldering operation, the solder flows by capillarity between the undulatory ribs 39 at the outer faces of arms 41 of the separator 29 and the relatively wide seating areas 35 at the outer faces of the water walls 32, and between the ribs 39 at the inner faces of arms 41 of separators 29. The parts are thus secured together in metal to metal contact, conducive to high rate of heat flow from the water walls to the separators. Referring more particularly to Figures 2 and 6, when the units are assembled in the manner stated, the water passages 26 are unobstructed for free flow downward therethrough of the water in a thin layer or sheet, the heat content of which is quickly extracted by the air cooled metal walls of the structure. That is conducive to comparatively high water flow capacity of the core while retaining its high heat exchange capacity, both desirable.

In the dip soldering operation the front and the back flanges of the tanks 21 and 22 are soldered to the top and the bottom of the core 20, as will be understood. The side flanges of the tanks may be soldered to the top and the bottom of the core in a suitable manner, conveniently by dip soldering. The completely assembled and soldered core, including the tanks 21 and 22, after being inspected and tested, is provided with a protective coating, conveniently by dipping it in a suitable coating material. In the completed core the undulatory air passages are of considerable length, as are the undulatory ribs defining, in whole or in part, such passages, so that the air flows through paths of considerable length and is subjected to high turbulence so as to be brought into intimate contact with large areas of metal, which is conducive to high efficiency in effecting rapid abstraction of heat from the metal by the cooling air.

In the core of my invention, the water wall members and the separators may readily be formed from metal strip, due to the provision of the cooperating positioning and retaining ribs on both members, which ribs are of appreciable extent and may be formed without the care and precision required in forming elements of materially less extent than such ribs, that is conducive to decreased cost of production, which is desirable. Further, the cooperating ribs of the core sections and the separators, in addition to facilitating positioning and assembly thereof, as above described, are mutually reinforcing and impart desirable rigidity and strength to the completed core, which enables it better able to withstand the severe jolts and stresses to which it is subjected in use.

It will be understood that variations in detail may be resorted to without departing from the field and scope of my invention, and I intend to include all such variations, as fall within the scope of the appended claims, in this application in which the preferred form only of my invention has been disclosed.

I claim:

1. In a cellular core for heat exchange units, a plurality of sections respectively comprising two spaced apart sheet metal water walls and a sheet metal separator between said water walls substantially parallel therewith, the water walls of adjacent sections having their front and back marginal portions secured together and being spaced apart therebetween providing water passages between the water walls of adjacent sections, said separator of the respective sections having transversely extending undulatory corrugations providing continuous ribs of undulatory formation lengthwise extending substantially the full width of said separator and outwardly of the latter toward said water walls and said water walls of the respective sections having transverse ribs of zig-zag formation lengthwise extending inwardly of the section toward said separator and defining bays opening in alternately opposite directions toward the ends of the respective water walls, the areas of said water walls between said ribs thereof being flat and said separator ribs spanning the space between said water walls and fitting between the ribs thereof with the crests of the undulations of said separator ribs extending into the bays of said water wall ribs and in cooperation therewith restraining said separator ribs against both transverse and lengthwise movement relative to said water walls, said separator ribs seating at their apices for substantially their full length on said flat areas of said water walls between said ribs thereof in metal to metal contact with said flat areas, the crests of the undulations of the respective separator ribs extending at least to the planes of the crests of the two next adjacent separator ribs at the same side thereof and said separator ribs defining with said water walls undulatory air passages extending from front to back of said section.

2. In a cellular core for heat exchange units, a plurality of sections respectively comprising two spaced apart sheet metal water walls and a sheet metal separator between said water walls substantially parallel therewith, the water walls of adjacent sections having their front and back marginal portions secured together and being spaced apart therebetween providing water passages between the water walls of adjacent sections, said separator of the respective sections having transversely extending undulatory corrugations providing continuous ribs of undulatory formation lengthwise extending substantially the full width of said separator and outwardly of the latter toward said water walls and said water walls of the respective sections having transverse ribs of zig-zag formation lengthwise extending inwardly of the section toward said separator and defining bays opening in alternately opposite directions toward the ends of the respective water walls, the areas of said water walls between said ribs thereof being flat and said separator ribs spanning the space between said water walls and fitting between the ribs thereof with the crests of the undulations of said separator ribs extending into the bays of said water wall ribs and in cooperation therewith restraining said separator ribs against both transverse and lengthwise movement relative to said water walls, said separator ribs seating at their apices for substantially their full length on said flat areas of said water walls between said ribs thereof in metal to metal contact with said flat areas, the crests of the undulations of the respective separator ribs overlapping the crests of the two next adjacent separator ribs at the same side thereof and said separator ribs defining with said water walls undulatory air passages extending from front to back of said section.

3. In a cellular core for heat exchange units, a plurality of sections respectively comprising two spaced apart sheet metal water walls and a sheet metal separator between said water walls substantially parallel therewith, the water walls of adjacent sections having their front and back marginal portions secured together and being spaced apart therebetween providing water passages between the water walls of adjacent sections, said separator of the respective sections having transversely extending undulatory corrugations providing continuous ribs of undulatory formation lengthwise extending substantially the full width of said separator and outwardly of the latter toward said water walls and said water walls of the respective sections having elements extending inwardly of the section toward said separator and defining bays opening toward the ends of said water walls, the areas of said water walls between said ribs thereof being flat and said separator ribs spanning the space between said water walls and fitting between said inwardly extending elements thereof with the crests of the undulations of said separator ribs extending into the bays of said inwardly extending water wall elements and in cooperation therewith restraining said separator ribs against both transverse and lengthwise movement relative to said water walls, said separator ribs seating at their apices for substantially their full length on said flat areas of said water walls between said elements thereof, in metal to metal contact with said flat areas, the crests of the undulations of the respective separator ribs extending at least to the planes of the crests of the two next adjacent separator ribs at the same side thereof and said separator ribs defining with said water walls undulatory air passages extending from front to back of said section.

4. In a cellular core for heat exchange units, a plurality of sections respectively comprising two spaced apart sheet metal water walls and a sheet metal separator between said water walls substantially parallel therewith, the water walls of adjacent sections having their front and back marginal portions secured together and being spaced apart therebetween providing water passages between the water walls of adjacent sections, said separator of the respective sections having transversely extending corrugations of curvilinear formation providing continuous ribs extending substantially the full width of said separator and outwardly of the latter toward said water walls and of curvilinear formation lengthwise with the undulations thereof merging smoothly one into the other and said water walls of the respective sections having transverse ribs of zig-zag formation lengthwise extending inwardly of the section toward said separator and defining bays opening in alternately opposite directions toward the ends of the respective water walls, the areas of said water walls between said ribs thereof being flat and said separator ribs spanning the space between said water walls and fitting between the ribs thereof with the crests of the undulations of said separator ribs extending into the bays of said water wall ribs and in cooperation therewith restraining said separator ribs against both transverse and lengthwise movement relative to said water walls, said separator ribs seating at their apices for substantially their full length on said flat areas of said water walls between said ribs thereof in metal to metal contact with said flat areas, the crests of the undulations of the respective separator ribs extending at least to the planes of the crests of the two next adjacent separator ribs at the same side thereof and said separator ribs defining with said water walls undulatory air passages extending from front to back of said section.

5. In a cellular core for heat exchange units, a plurality of sections respectively comprising two spaced apart sheet metal water walls and a sheet metal separator between said water walls substantially parallel therewith, the water walls of adjacent sections having their front and back marginal portions secured together and being spaced apart therebetween providing water passages between the water walls of adjacent sections, said separator of the respective sections having transversely extending corrugations of curvilinear formation providing continuous ribs extending substantially the full width of said separator and outwardly of the latter toward said water walls and of curvilinear formation lengthwise with the undulations thereof merging smoothly one into the other and said water walls of the respective sections having transverse ribs of zig-zag formation lengthwise extending inwardly of the section toward said separator and defining bays opening in alternately opposite directions toward the ends of the respective water walls, the areas of said water walls between said ribs thereof being flat and said separator ribs spanning the space between said water walls and fitting between the ribs thereof with the crests of the undulations of said separator ribs extending into the bays of said water wall ribs and in cooperation therewith restraining said separator ribs against both transverse and lengthwise movement relative to said water walls, said separator ribs seating at their apices for substantially their full length on said flat areas of said water walls between said ribs thereof in metal to metal contact with said flat areas, the crests of the undulations of the respective separator ribs overlapping the crests of the two next adjacent separator ribs at the same side thereof and said separator ribs defining with said water walls undulatory air passages extending from front to back of said section.

References Cited in the file of this patent

UNITED STATES PATENTS

| | | |
|---|---|---|
| 1,606,643 | Kramer et al. | Nov. 9, 1926 |
| 1,939,175 | Kramer | Dec. 12, 1933 |
| 2,016,822 | Przyborowski | Oct. 8, 1935 |
| 2,083,671 | Schutt | June 15, 1937 |
| 2,539,701 | Przyborowski | Jan. 30, 1951 |
| 2,594,008 | Getz | Apr. 22, 1952 |